United States Patent
Cho

(10) Patent No.: US 7,136,715 B2
(45) Date of Patent: Nov. 14, 2006

(54) WORKING-SYSTEM FOR SINGLE PATH AND CONTROL METHOD THEREOF

(75) Inventor: Young-il Cho, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/843,293

(22) Filed: May 12, 2004

(65) Prior Publication Data

US 2005/0015168 A1    Jan. 20, 2005

(30) Foreign Application Priority Data

Jul. 16, 2003    (KR) ............ 10-2003-0048894

(51) Int. Cl.
*G06F 19/00* (2006.01)
(52) U.S. Cl. ............ 700/100; 700/99; 700/101
(58) Field of Classification Search ............ 700/28, 700/99, 100, 101
See application file for complete search history.

(56) References Cited

U.S. PATENT DOCUMENTS

| | | | |
|---|---|---|---|
| 4,827,423 A * | 5/1989 | Beasley et al. ............ 700/96 |
| 5,586,021 A * | 12/1996 | Fargher et al. ............ 700/100 |
| 5,946,663 A * | 8/1999 | Tanaka et al. ............ 705/8 |
| 6,049,745 A | 4/2000 | Douglas et al. |
| 6,405,157 B1 * | 6/2002 | Fujii et al. ............ 703/2 |
| 6,560,508 B1 * | 5/2003 | Radican ............ 700/214 |
| 6,615,097 B1 * | 9/2003 | Ozaki ............ 700/121 |
| 2004/0010334 A1 * | 1/2004 | Bickley et al. ............ 700/99 |

FOREIGN PATENT DOCUMENTS

| | | |
|---|---|---|
| JP | 04-053657 | 2/1992 |
| JP | 06-271019 | 9/1994 |
| JP | 10-039909 | 2/1998 |
| JP | 11-259131 | 9/1999 |
| JP | 2000-084800 | 3/2000 |
| JP | 2001-282356 | 10/2001 |
| KR | 156483 | 7/1998 |
| KR | 2001-67411 | 7/2001 |

* cited by examiner

*Primary Examiner*—Jayprakash N. Gandhi
(74) *Attorney, Agent, or Firm*—Staas & Halsey LLP

(57) ABSTRACT

A working-system for a single path having a plurality of equipment set along the single path and a plurality of working-objects performing predetermined jobs on the plurality of the equipment while moving along the single path, including: a simulator estimating job completion times according to job orders by which the jobs are processed, and priority orders among the jobs, in response to there being an interference between the working-objects; and a job allocator allocating the jobs having an optimal job order and an optimal priority order to an optimal working-object to minimize the job completion times.

18 Claims, 6 Drawing Sheets

WORKING-SYSTEM FOR SINGLE PATH AND CONTROL METHOD THEREOF

CROSS-REFERENCE TO RELATED APPLICATIONS

This application claims the benefit of Korean Patent Application No. 2003-48894, filed Jul. 16, 2003, in the Korean Intellectual Property Office, the disclosure of which is incorporated herein by reference.

BACKGROUND OF THE INVENTION

1. Field of the Invention

The present invention relates to a working-system for a single path and a control method thereof, and, more particularly, to a working-system for a single path and a control method thereof performing a job without limiting a working area.

2. Description of the Related Art

There are various possible forms of a work-system performing a job while moving along a single path. As an example, a process of conveying a load from equipment near the single path to other equipment is divided into a loading process carrying the load from the initial equipment onto a working unit, and an unloading process unloading the load from the working unit onto the subsequent equipment.

FIGS. 1A and 1B illustrate a conventional working-system performing a job on a single path.

As illustrated in FIGS. 1A and 1B, the working-system comprises equipment 110, conveying units 120, and a single path 130.

The equipment 110 may be a shelf or a working desk performing a specific function. The equipment 110 should be disposed on the single path with a predetermined interval between pieces of the equipment 110.

The conveying units 120, including a unit to transfer the load back and forth to the equipment 110, are configured to move forward and backward along the single path 130.

The working-system illustrated in FIG. 1A includes a pair of the conveying units 120, comprising a first conveying unit 121 and a second conveying unit 122, which are set to perform a job in a first working area and a second working area, respectively. Such a working-system becomes inefficient when a situation requires only the first conveying unit 121 to perform several jobs in the first working area, while the second conveying unit 122 remains idle.

A working-system illustrated in FIG. 1B includes a pair of the conveying units 120, comprising a third conveying unit 123 and a fourth conveying unit 124, which are set to perform a job in an area "A" and an area "B", respectively. However, the area "A" and the area "B" have a common area, or an area "C", where both the third conveying unit 123 and the fourth conveying unit 124 can perform the job.

FIG. 2 is a control block diagram illustrating the job allocation of the working-system illustrated in FIG. 1B.

Hereinbelow, operation of a conventional working-system for the single path will be described in reference to FIG. 1B and FIG. 2.

When the working-system is assigned with a new job at operation B1, it is determined whether the job should be processed in the common area at operation B2.

When it is determined that the job should be processed in the common area, at operation B3, working-times required for each of the conveying units 123 and 124 are calculated to find a job order which takes the least amount of time while avoiding a jam with another job in the common area. At operation B4, the job is allocated to the conveying units 120 taking the least amount of time based on the calculated working-times.

At operation B4, if the job is not to be processed in the common area, the job is allocated to the appropriate one of the conveying units 120 in an appropriate area.

If the new job is assigned in an exclusive area where only one of the conveying units 120 can perform the job, the job is allocated to the appropriate one of the conveying units 120. Meanwhile, if the job is assigned in the common area, where the plurality of the jobs can be processed at the same time, the job should be allocated to the one of the conveying units 120 which takes the least amount of time in conveying, with consideration of the job order, to avoid a jam in the common area.

The conventional working-system for the single path 130 may have a limitation in a layout when the area should be divided. It may not be able to process the job assigned to an exclusive area, or may have to process the job twice by splitting the area with a buffering area in the middle. The job allocation may be so inefficient that a conveying time has to be increased, due to an interference between the conveying units 120 not being considered enough to be processed efficiently. Also, there is a problem in that an expansion of the common area may be followed by an increase of the conveying time.

SUMMARY OF THE INVENTION

Accordingly, it is an aspect of the present invention to provide a working-system, and a control method thereof, to reduce a working-time by allocating a job efficiently.

Additional aspects and/or advantages of the invention will be set forth in part in the description which follows and, in part, will be obvious from the description, or may be learned by practice of the invention.

The foregoing and/or other aspects of the present invention are achieved by providing a working-system for a single path having a plurality of equipment set along the single path and a plurality of working-objects performing predetermined jobs on the plurality of the equipment while moving along the single path, comprising: a simulator estimating job completion times according to job orders by which the jobs are processed, and priority orders among the jobs, in response to there being an interference between the working-objects; and a job allocator allocating the jobs having an optimal job order and an optimal priority order to an optimal working-object to minimize the job completion times.

According to an aspect of the invention, the simulator may estimate the job completion times for all the job orders and all the priority orders that a new job may take as the new job is assigned, wherein the job allocator allocates the new job having the optimal job order and the optimal priority order to the optimal working-object to minimize the job completion times.

According to an aspect of the invention, the working-system for the single path may further comprise a job canceler canceling cancelable jobs among the allocated jobs that the working-objects were holding when a new job is assigned, wherein the simulator estimates the job completion times for all the job orders and all the priority orders for which the cancelled jobs may be newly assigned; and wherein the job allocator allocates the cancelled jobs having the optimal job order and the optimal priority order to the optimal working-object to minimize the job completion times.

According to an aspect of the invention, the plurality of equipment may comprise a shelf receiving and supplying goods; and the plurality of working-object may comprise at least one conveying unit loading and unloading the goods to and from the shelf.

According to an aspect of the invention, the job allocator may increase a priority order of a job that has not been performed within a predetermined time after the job is assigned.

The above and/or other aspects may be also achieved by providing a control method of a working-system for a single path having a plurality of equipment set along the single path and a plurality of working-objects performing predetermined jobs on the plurality of the equipment while moving along the single path, comprising: estimating job completion times of possible job orders and priority orders that all the jobs may take; and allocating the jobs having an optimal job order and an optimal priority order to an optimal working-object to minimize the job completion times.

According to an aspect of the invention, the control method of the working-system for the single path may further comprise: estimating the job completion times for all the job orders and all the priority orders that a new job may take as the new job is assigned; and allocating the new job having the optimal job order and the optimal priority order to the optimal working-object to minimize the job completion times.

According to an aspect of the invention, the control method of the working-system for the single path may further comprise: canceling cancelable jobs among the jobs that the working-objects were holding when a new job is assigned; estimating the job completion time for all the job orders and all the priority orders for which the cancelled jobs may be newly assigned; and allocating the canceled jobs having the optimal job order and the optimal priority order to the optimal working-object to minimize the job completion times.

According to an aspect of the invention, the control method of the working-system for the single path may further comprise increasing a priority order of a job that has not been performed within a predetermined time after the job is assigned.

BRIEF DESCRIPTION OF THE DRAWINGS

The above and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1A:
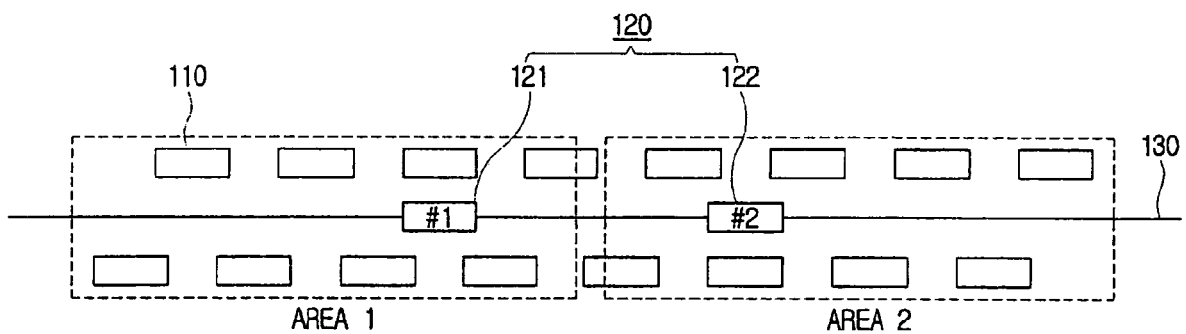
FIG. 1A illustrates a conventional working-system for a single path where each working-object has an exclusive working area.
Figure 1B:
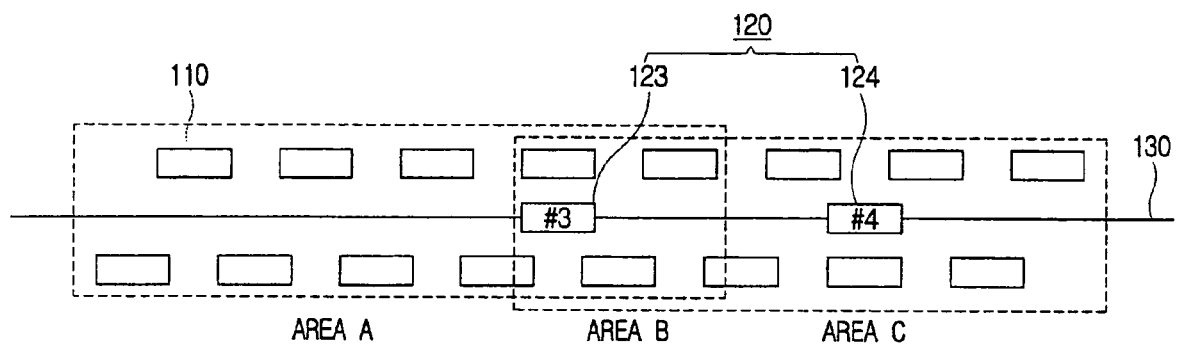
FIG. 1B illustrates a conventional working-system for a single path where working-object have a common working area.
Figure 2:
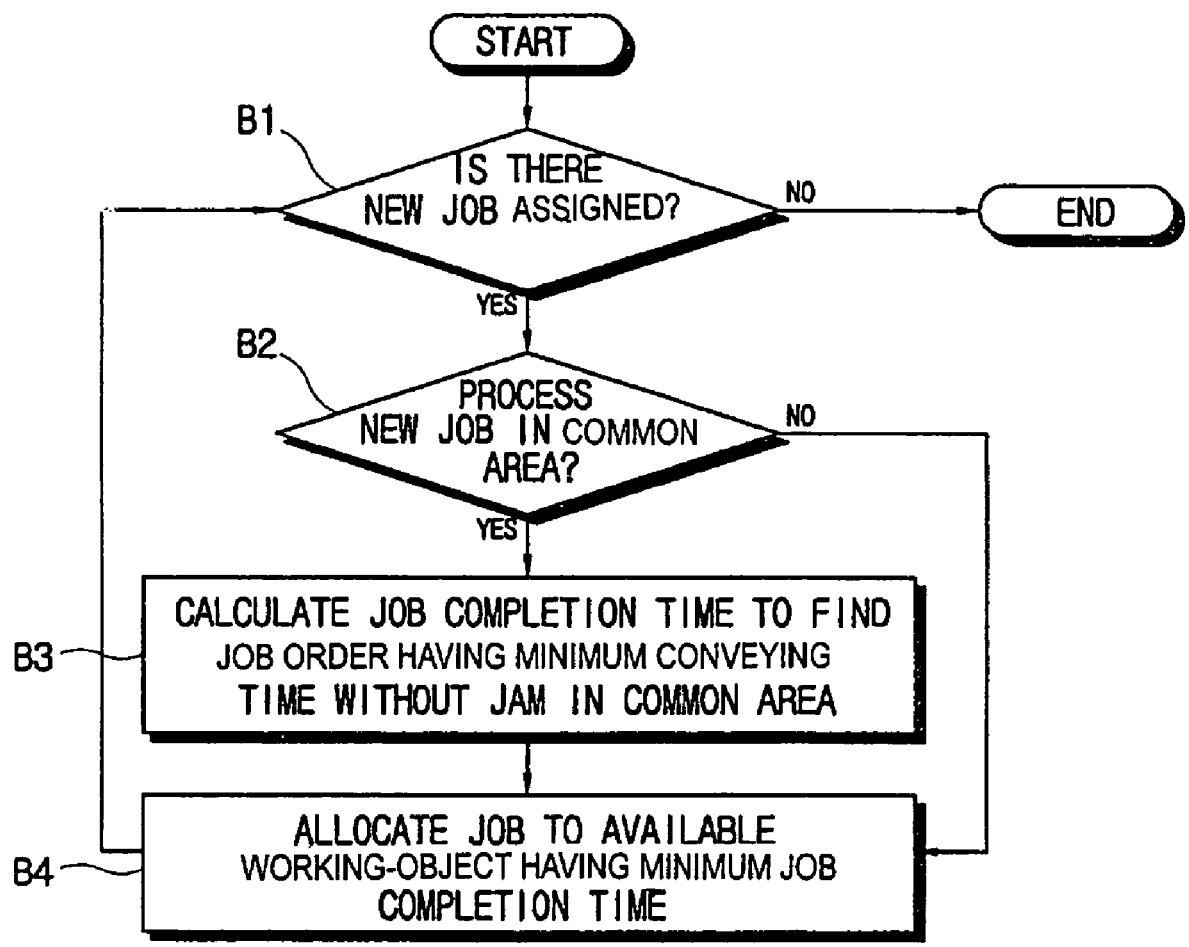
FIG. 2 is a control block diagram of a job allocation of the working-system illustrated in FIG. 1B.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
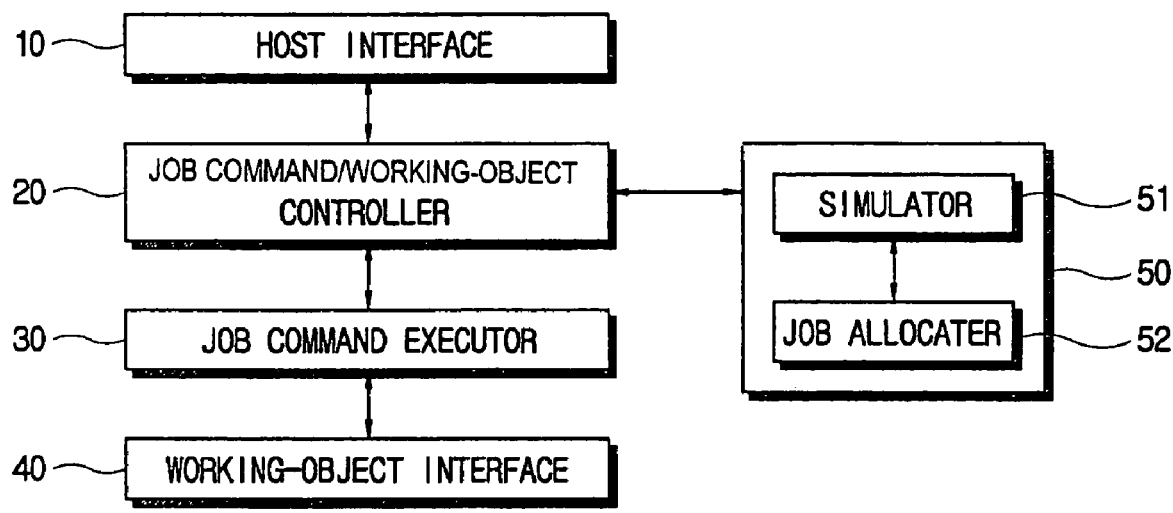
FIG. 3 is a block diagram of a working-system for a single path according to an embodiment of the present invention.

FIG. 3 is a block diagram of a working-system for a single path according to an embodiment of the present invention.

As illustrated in FIG. 3, the working-system for the single path comprises a host interface 10, a job command/working-object controller 20, a job command executor 30, a working-object interface 40, and a job distributor 50.

The host interface 10 transfers data and an execution command to and from a host computer (not shown). The job command/working-object controller 20 receives data on a new job from the host interface 10, and transfers a position and a command description to the job command executor 30.

The job command executor 30, which executes the job command received from the job command/working-object controller 20, may be a conveying unit or a robot system. The working-object interface 40 looks for the object and equipment required for completion of the job.

The job distributor 50 includes a simulator 51 and a job allocator 52. The simulator 51 estimates a job completion time required for a working-object to complete a job having a certain job order and a certain priority order. The job allocator 52 allocates the job, having an optimized job order and priority order, to an optimal working-object to minimize the job completion time estimated by the simulator 51. Information on the job allocation determined by the job distributor 50 is transferred to the job command/working-object controller 20.

Figure 4:
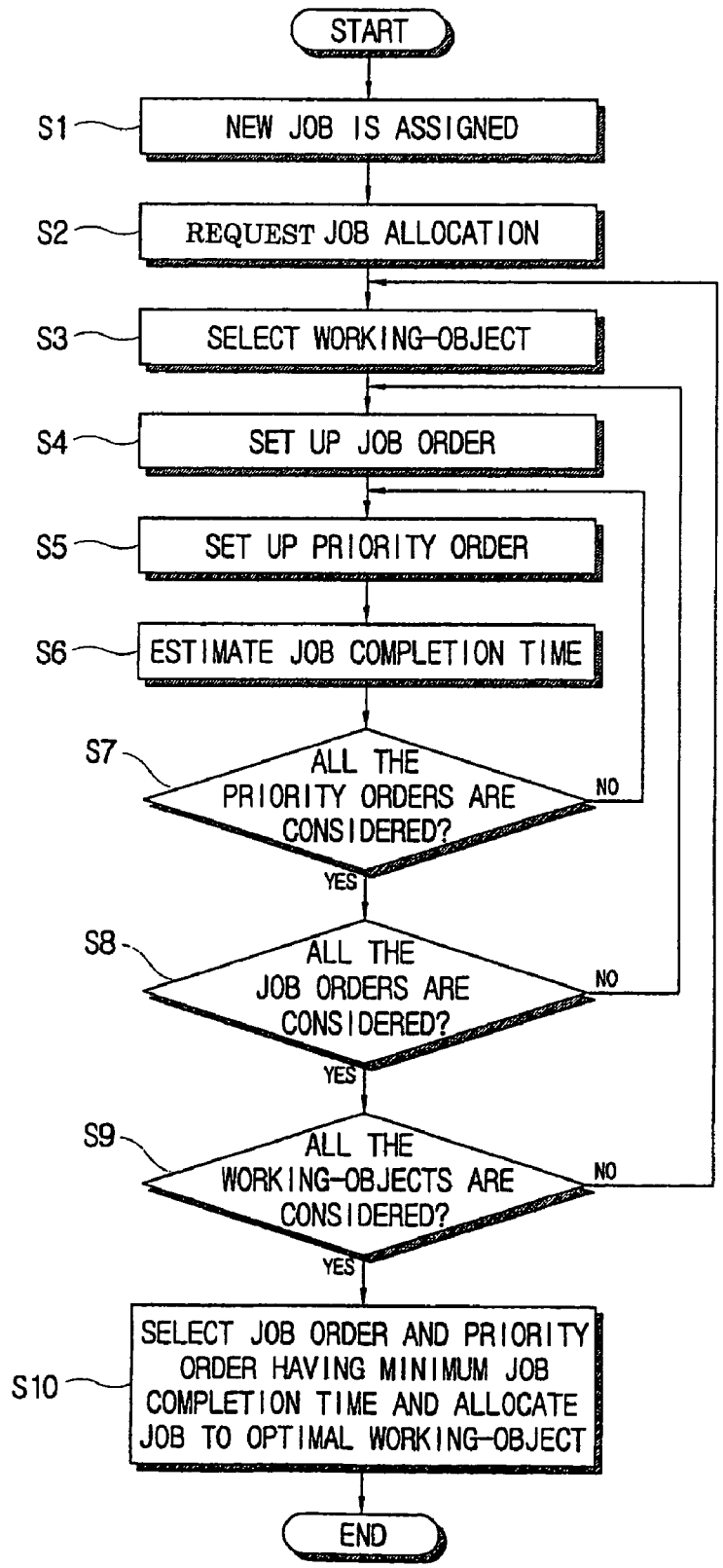
FIG. 4 is a flow chart of a job allocation operation according to an embodiment of the present invention.

FIG. 4 is a flow chart of a job allocation operation according to an embodiment of the present invention.

As illustrated in the FIG. 4, if a new job is assigned at operation S1, the information on the assigned job is transferred to the job command/working-object controller 20 from the host computer (not shown) via the host interface 10. Then, at operation S2, the job command/working-object controller 20 requests the job allocation from the job distributor 50.

The job distributor 50 selects a preliminary working-object which is to be allocated with the new job at operation S3. At operation S4, the job distributor 50 sets up the job order for jobs previously allocated to the selected working-object, and the new job temporarily allocated. Also, at operation S5, a priority order is set up for the jobs previously allocated to the selected working-object and adjacent working-objects. The job order and the priority order are randomly chosen among the numbers of order available at selection.

The simulator 51 estimates the job completion time for all the jobs, with consideration of the job orders and the priority orders of the jobs allocated to each of the working-objects at operation S6.

At operation S7, the simulator 51 estimates the job completion time after an available priority order, other than the priority order chosen already for the other jobs, is given to the new job requesting the job allocation. The simulator 51 estimates the job completion time repeatedly for the jobs of all the possible priority orders. At operation S8, if simulations for the jobs of all the possible priority orders are completed, the simulator 51 estimates the job completion time for all the possible job orders while changing the priority order of the new job requesting the job allocation.

If a calculation of the job completion time with consideration of all the possible priority orders and all the possible job orders for the preliminarily selected working-object is completed, the simulator 51 repeats this simulation process for another working-object at operation S9.

If the calculation of the job completion time with consideration of all the possible priority orders and all the possible job orders for all the working-objects is completed, the job distributor 52 selects the job order and the priority order having a minimum job completion time, and allocates the job to an optimal working-object at operation S10.

FIG. 4 is a flow chart illustrating an allocation of the job to the optimal working-object by setting up the optimal job order and priority order for the job, in response to a request for the job allocation, as the job is newly assigned.

Figure 5:
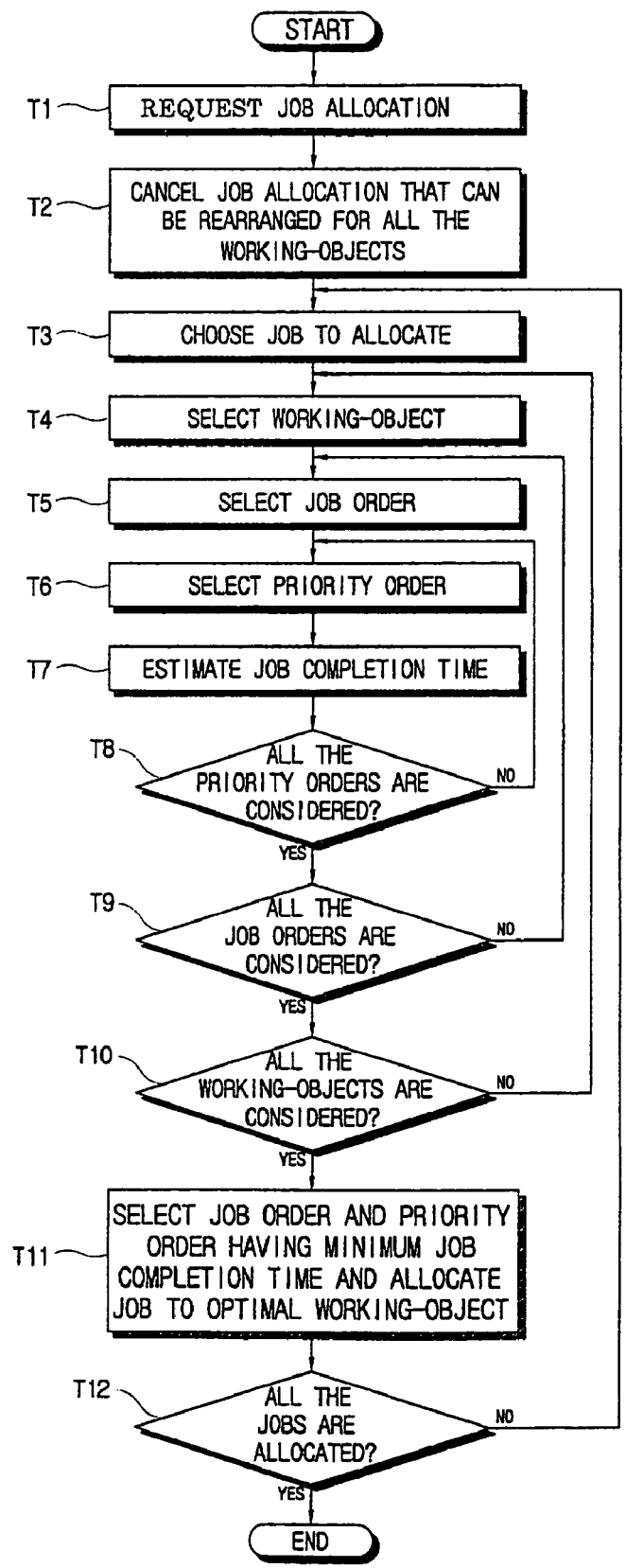
FIG. 5 is a flow chart of a job allocation operation according to another embodiment of the present invention.

FIG. 5 is a flow chart illustrating a rearrangement and optimization of a job allocation for a previous job and a new job after canceling a previous job allocation to a previous working-object when the new job is newly assigned in the process illustrated in FIG. 4.

According to FIG. 5, when there comes a request for a job allocation as a new job is assigned at operation T1, the job allocations that can be rearranged for all the working-objects on the single path, or that can be cancelled, are cancelled at operation T2. At operation T3, a job is chosen to be allocated out of the plurality of the cancelled jobs and the new job requesting the job allocation.

At operations T4 through T11, when selecting a first job for allocation, the first job is allocated with the optimized priority order and the optimized job order to the optimal working-object according to the same process with the process described in FIG. 4.

At operation T12, it is determined whether all the jobs are allocated to an appropriate working-object. At operations T3 through T12, if not all the jobs are allocated, a next job is allocated with the optimized condition after selection of the next job. Accordingly, all the jobs are allocated through the repeated job allocation loop.

The request for a job allocation does not necessarily come about only when a new job is assigned. If there is a working-object that completed a job among the plurality of the working-object on the single path, the working-object that completed the job requests the job allocation. As illustrated in FIG. 5, the working-object that completed the job can be allocated with another job after canceling the previous allocation of the job which was allocated to another working-object having extra jobs.

It is important to find an optimized path which minimizes the job completion time at a stage of setting the job order in the case in which there could be interference among the working-objects. In the job allocation, it is preferably determined, although not required, whether there is a specific working-object requiring a specific order to work. The optimized path is considered at this stage.

However, in optimization, a complex arithmetic calculation is required to acquire an optimized answer because of the large number of possible orders.

As an example of the complex arithmetic involved in optimizing job orders, Table 1 illustrates a case in which two working-objects, having four jobs each, have to be allocated with an additional four jobs. An $_nC_r$ is a number of subsets with r elements chosen from a set with n elements. For instance, there are six possible combinations of subsets represented by $_4C_2$ (the possibilities from the set {W,X,Y,Z} are {W,X}, {W,Y}, {W,Z}, {X,Y}, {X,Z}, and {Y,Z}). An $_nH_r$ is a number of subsets with r elements chosen from a set with n elements, wherein the r element can be repeatedly chosen. For instance, there are ten possible combinations of subsets represented by $_4H_2$ (the possibilities from the set {W,X,Y,Z} are {W,X}, {W,Y}, {W,Z}, {X,Y}, {X,Z}, {Y,Z}, {W,W}, {X,X}, {Y,Y}, and {Z,Z}.

TABLE 1

| the number of cases that jobs can be allocated = | |
|---|---|
| $_4C_0 + {_4C_1} + {_4C_2} + {_4C_3} + {_4C_4} =$ | 16 |
| the number of possible job orders = | |
| $_4C_0 \times {_4H_0} \times {_4H_4} \times 4! + {_4C_1} \times {_4H_1} \times {_4H_3} \times 3! + {_4C_2} \times {_4H_2} \times {_4H_2} \times 2! \times 2! + {_4C_3} \times {_4H_3} \times {_4H_1} \times 3! + {_4C_4} \times {_4H_4} \times {_4H_0} \times 4! =$ | 1310 |
| the number of possible job orders with priority = | |
| $_4C_0 \times {_4H_0} \times {_4H_4} \times 4! \times {_5H_8} + {_4C_1} \times {_4H_1} \times {_4H_3} \times 3! \times {_6H_7} + {_4C_2} \times {_4H_2} \times {_4H_2} \times 2! \times 2! \times {_7H_6} + {_4C_3} \times {_4H_3} \times {_4H_1} \times 3! \times {_8H_5} + {_4C_4} \times {_4H_4} \times {_4H_0} \times 4! \times {_9H_4} =$ | 1095930 |

As illustrated in Table 1, the number of the possible job orders with an additional job increased greatly compared to the original number of possible job orders. This may cause an overload in a program runtime when the job distributor receives the request for the job allocation.

Table 2 describes an algorithm searching for the priority order that may cause the interference when the first working-object and the second working-object have four jobs each.

TABLE 2

| A | B | C | D | E | F | G | H |
|---|---|---|---|---|---|---|---|
| ①/ | ② | ③// | ④ | 1/ | 2// | 3 | 4 |
| ①/ | ② | 1/ | 2// | ③// | ④/// | 3 | 4/// |
| ①/ | ② | 1/ | 2// | ③// | 3 | 4/// | ④/// |
| ①/ | ② | 1/ | 2// | 3 | ③// | ④ | 4 |
| ①/ | 1/ | ② | ③ | ④ | 2 | 3 | 4 |
| 1/ | ①/ | ② | ③ | ④// | 2 | 3 | 4// |
| 1/ | ①/ | ② | ③ | 2 | 3 | 4// | ④// |

Columns A through H in Table 2 represent the priority order. The priority orders of jobs differ according to each row. Symbols ecrc;1 through ④ represent the jobs of the first working-objects, and symbols 1 through 4 represent the jobs of the second working-object. A slash mark "/" indicates interference between corresponding jobs of the two work objects. Corresponding jobs with which an interference problem is an issue are indicated by the number of slash marks (/, //, or ///).

Herein, interference means that one working-object cannot do a job because of the other working object. The priority is a criterion of the job that can be done prior to the other job when the interference happens. In the Table 2, A-H represent priority order and A, the left item, is a higher priority than H, the right item.

Referring to the first row in Table 2, the priorities of the first working-object's jobs are higher than those of the second object's jobs. According to simulation at the state of priority in the first row, assume that ① interferes with 1, and ③ interferes with 2. Jobs with later priorities than the final interference don't cause interference even though their priority changes. Therefore, we need not simulate priority orders after the final interference, which reduces computation time. But after the priority order of ③ and 2 change, simulation results in a new interference of some jobs with a lower job order than ③ and ②. This is shown as interference of ④ and ④ in the second row.

As above, the priority order of ④ and ④ would have to be changed and then simulated. The next few rows continue to be simulated in the same manner, by switching the priority order of the two corresponding interfering jobs with the lowest priority. When the interferences of those two jobs is eliminated (as in row 5, regarding ④ and ④), the simulation switches the priority order of the interfering jobs that then have the lowest priority order (② and ③ in row 5 ).

In row 6, another interference is addressed after changing priority order of jobs with a higher job order than ③, ②. For this, the priority of second working-objects jobs is changed high and simulated repeatedly. If only ① and ① cause interference optimally, we simulate after changing priority order of ① and ① as shown in the 6$^{th}$ and 7$^{th}$ rows.

Shortly, this simulation is used to search for an optimum priority order which allows working time to remain at a minimum. The above algorithm saves computing time because any further simulation after a last interference is not needed as extra changes of the priority orders after the last interference do not make further interference. But changing the priority order of jobs before a final interference causes new interference and need to be simulated. This helps to diminish simulation running times.

In the case described above, the number of possible job orders with additional jobs is 70. With the algorithm illustrated in Table 2, seven iterations of repeated simulation is needed to find all the possible job orders with additional jobs, but the number of iterations may be changed depending on different cases. Accordingly, an amount of calculation by the simulation, which is a load on a program, can be reduced. Briefly, the algorithm can be described as a method of skipping unnecessary simulations, when extra calculations are not needed arithmetically, by aligning the priority orders of the jobs in a way that exchanges the priority orders of the jobs causing the last interference in the simulation and searches for a next interference. Accordingly, this method reduces the amount of the calculation needed to find all the possible number of cases.

However, the algorithm described above is a simplified case in which all the jobs take the same amount of time and can be processed independently.

If the working-object is a conveying unit which mainly operates to load and unload, the cancelable job, or the job which may be re-allocated, should be limited to a loading operation. Also, it will require additional calculation for additional components such as the capability of the working-object.

It is preferable to raise the priority of a job that has not been completed for a long time in order to finish the job in a short time. This procedure can be implemented by various methods.

The job allocator 52 can determine the job completion time with additional consideration of other components, such as a passage of time since the job was issued, at the stage deciding the optimal priority order. The additional consideration enhances the optimal job allocation and processing of a job that has been delayed for a long time.

The working-system for the single path and the control method thereof according to the present invention optimizes the job allocation by minimizing the interference between the working-objects on the single path with improved control, and also increases job efficiency by not limiting a working area of the working-objects.

Although a few embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A working-system for a single path having a plurality of equipment set along the single path and a plurality of working-objects performing predetermined jobs on the plurality of the equipment while moving along the single path, comprising:

a simulator estimating job completion times, for the single path, according to job orders by which the jobs are processed, and priority orders among the jobs, in response to there being an interference between the working-objects; and a job allocator allocating the jobs having an optimal job order and an optimal priority order to an optimal working-object to minimize the job completion times based on the estimated job completion times.

2. The working-system according to claim 1, wherein the simulator estimates the job completion times for all the job orders and all the priority orders that a new job may take as the new job is assigned; and wherein the job allocator allocates the new job having the optimal job order and the optimal priority order to the optimal working-object to minimize the job completion times.

3. The working-system according to claim 2, wherein the plurality of equipment comprises a shelf receiving and supplying goods; and the plurality of working-objects comprise at least one conveying unit loading and unloading the goods to and from the shelf.

4. The working-system according to claim 1, further comprising a job canceler canceling cancelable jobs among the allocated jobs that the working-objects were holding when a new job is assigned, wherein the simulator estimates the job completion times for all the job orders and all the priority orders for which the cancelled jobs may be newly assigned; and wherein the job allocator allocates the cancelled jobs having the optimal job order and the optimal priority order to the optimal working-object to minimize the job completion times.

5. The working-system according to claim 2, further comprising a job canceler canceling cancelable jobs among the allocated jobs that the working-objects were holding when the new job is assigned, wherein the simulator estimates the job completion times for all the job orders and all the priority orders for which the cancelled jobs may be newly assigned; and wherein the job allocator allocates the cancelled jobs having the optimal job order and the optimal priority order to the optimal working-object to minimize the job completion times.

6. The working-system according to claim 4, wherein the cancelable jobs of the working-objects that are conveying units are limited to loading operations.

7. The working-system according to claim 1, wherein the plurality of equipment comprises a shelf receiving and supplying goods; and the plurality of working-objects comprise at least one conveying unit loading and unloading the goods to and from the shelf.

8. The working-system according to claim 1, wherein the job allocator increases a priority order of a job that has not been performed within a predetermined time after the job is assigned.

9. The working-system according to claim 1, further comprising:
- a host interface to transfer data and an execution command to and from a host computer;
- a job command/working-object controller to receive data on new jobs from the host interface;
- a job command executor to execute job commands received from the job command/working-object controller;
- a working-object interface to receive position and command descriptions from the job command/working-object controller, and search for the working-objects and the equipment required for completion of the jobs; and
- a job distributor which contains the simulator and the job allocator.

10. The working-system according to claim 9, wherein the job command executor is a conveying unit or a robot system.

11. The working-system according to claim 1, wherein the job order occurs in response to one of the working-objects completing an allocated job.

12. A control method of a working-system for a single path having a plurality of equipment set along the single path and a plurality of working-objects performing predetermined jobs on the plurality of the equipment while moving along the single path, comprising:
- estimating job completion times, for the single path, of possible job orders and priority orders that all the jobs may take; and
- allocating the jobs having an optimal job order and an optimal priority order to an optimal working-object to minimize the job completion times.

13. The control method according to claim 12, further comprising:
- estimating the job completion times for all the job orders and all the priority orders that a new job may take as the new job is assigned; and
- allocating the new job having the optimal job order and the optimal priority order to the optimal working-object to minimize the job completion times.

14. The control method according to claim 13, further comprising:
- canceling cancelable jobs among the jobs that the working-objects were holding when a new job is assigned;
- estimating the job completion times for all the job orders and all the priority orders for which the cancelled jobs may be newly assigned; and
- allocating the canceled jobs having the optimal job order and the optimal priority order to the optimal working-object to minimize the job completion times.

15. The control method according to claim 12, further comprising:
- canceling cancelable jobs among the jobs that the working-objects were holding when a new job is assigned;
- estimating the job completion times for all the job orders and all the priority orders for which the cancelled jobs may be newly assigned; and
- allocating the canceled jobs having the optimal job order and the optimal priority order to the optimal working-object to minimize the job completion times.

16. The control method according to claim 12, further comprising increasing a priority order of a job that has not been performed within a predetermined time after the job is assigned.

17. A working-system for a single path having a plurality of equipment set along the single path and a plurality of working-objects performing predetermined jobs on the plurality of the equipment while moving along the single path, comprising:
- a job distributing unit to simulate job completion times, for the single path, of different possible job orders as assigned to different combinations of working-objects in response to there being an interference between the working-objects;
- wherein the job distributing unit allocates the jobs having an optimal job order to an optimal combination of working-objects.

18. A working-system for a single path having a plurality of equipment set along the single path and a plurality of working-objects performing predetermined jobs on the plurality of the equipment while moving along the single path, comprising:
- a job distributing unit to simulate job completion times, for the single path, of different possible priority orders among the jobs as assigned to different combinations of working-objects;
- wherein the job distributing unit allocates the jobs having an optimal priority order to an optimal combination of working-objects.

* * * * *